(12) United States Patent
Lewis

(10) Patent No.: US 7,243,409 B2
(45) Date of Patent: Jul. 17, 2007

(54) WELDABLE CONDUIT METHOD OF FORMING

(76) Inventor: John K. Lewis, 14006 Blazey Dr., Houston, TX (US) 77095

( * ) Notice: Subject to any disclaimer, the term of this patent is extended or adjusted under 35 U.S.C. 154(b) by 678 days.

(21) Appl. No.: 10/634,583

(22) Filed: Aug. 5, 2003

(65) Prior Publication Data

US 2005/0005983 A1    Jan. 13, 2005

Related U.S. Application Data

(63) Continuation-in-part of application No. 10/616,014, filed on Jul. 9, 2003, now abandoned.

(51) Int. Cl.
  *B23P 21/00*   (2006.01)
  *B21D 51/16*  (2006.01)
(52) U.S. Cl. ..................... 29/469; 29/890.14
(58) Field of Classification Search .................. 29/469, 29/525.14, 525.13, 505, 508, 511, 520, 527.7, 29/890.14, 282, 237; 285/27, 288.1, 55, 285/123.1, 123.15; 228/131
See application file for complete search history.

(56) References Cited

U.S. PATENT DOCUMENTS 831,887 A    9/1906    Nicholson (Continued)

FOREIGN PATENT DOCUMENTS

EP    0 103 439 B    3/1984

OTHER PUBLICATIONS

"TFP & TFT Metal Lined Pipe & Tubing"; Internet brochure of Kuroki Tube and Pipe Co., LTD.; pp. 1-8.

"Clad Line Pipe for Oil & Gas Fields"; Sumitomo Metal Industries, LTD.; No. 14421/Printed in Japan by New Market Inc./2; 7 pages. 3 G Position Welding by DPS-CII GTAW Process; 1 page.

(Continued)

*Primary Examiner*—John C. Hong
(74) *Attorney, Agent, or Firm*—Jeffrey L. Streets; Streets & Steele

(57) ABSTRACT

A composite conduit suitable for transporting corrosive and/or erosive fluids including gases, liquids or slurries, is formed by positioning a tube formed of a material having desirable corrosion and/or erosion resistant properties within a pipe formed of a commonly weldable material such that one end of the tube is aligned with one end of the pipe. The tube has an outer diameter slightly less than the inner diameter of the pipe. The tube is affixed to the pipe by connecting the aligned ends thereof, and the pipe is compressed in a reducing operation so that the inner diameter of the pipe is reduced to a diameter that is less than or equal to the outer diameter of the tube. Adjacent, end-to-end sections of the composite conduit are connected using a coupling that employs a cylindrical body formed of the same material as the tubes of the conduits. The coupling body has an outer diameter that is slightly less than the inner diameter of the tubes of the conduits, and preferably an inner diameter that varies to form a taper at each end of the body. The body further contains a circumferential recess intermediate the ends of the body, and a ring formed of the same material as the tubes of the conduits. The ring is positioned within the recess of the body and has a circumferential stop means for limiting movement of the ends of the body within the respective ends of the conduits by the ends of the conduits abutting the stop means. At least one circumferential seal is positioned intermediate the recess and each of the tapered ends of the body for sealing the interconnected conduits. An insulator is preferably positioned in the recess between the ring and the coupling body for inhibiting the transfer of heat produced by welding the ends of the conduits together, although the insulator is not essential in all embodiments.

15 Claims, 5 Drawing Sheets

U.S. PATENT DOCUMENTS

| | | |
|---|---|---|
| 2,371,348 A | 3/1945 | Murray |
| 3,397,445 A | 8/1968 | Ulmer et al. |
| 3,481,024 A | 12/1969 | Bunn |
| 3,604,102 A | 9/1971 | Boccalari et al. |
| 3,735,478 A | 5/1973 | Porter et al. |
| 3,863,328 A | 2/1975 | Arntz |
| 4,049,184 A | 9/1977 | Rozengart et al. |
| 4,125,924 A | 11/1978 | Goetze et al. |
| 4,162,758 A | 7/1979 | Mikarai |
| 4,319,121 A | 3/1982 | Yoshida |
| 4,367,838 A | 1/1983 | Yoshida |
| 4,470,188 A | 9/1984 | Holbrook |
| 4,533,806 A | 8/1985 | Kawasaki et al. |
| 4,765,529 A | 8/1988 | Turner |
| 4,784,311 A | 11/1988 | Sugao |
| 4,795,078 A | 1/1989 | Kuroki et al. |
| 4,886,203 A | 12/1989 | Puzrin et al. |
| 4,913,465 A | 4/1990 | Abbema et al. |
| 5,005,756 A | 4/1991 | Muggeo et al. |
| 5,131,583 A | 7/1992 | Matsumoto |
| 5,219,187 A | 6/1993 | Mikitka |
| 5,265,790 A | 11/1993 | Mumford, III et al. |
| 5,275,893 A | 1/1994 | Miyasaki et al. |
| 5,346,261 A | 9/1994 | Abbema |
| 5,547,228 A | 8/1996 | Abbema et al. |
| 5,566,984 A | 10/1996 | Abbema et al. |
| 5,984,370 A | 11/1999 | Lewis |
| 5,988,484 A | 11/1999 | Osborn et al. |
| 6,250,125 B1 | 6/2001 | Ukai et al. |
| 6,471,249 B1 | 10/2002 | Lewis |
| 6,536,806 B1 | 3/2003 | Uematsu et al. |
| 2003/0094209 A1 | 5/2003 | Imasaki et al. |

OTHER PUBLICATIONS

"Where Toughness Counts Most, High Nickel-Clad Welded Pipe with Superior Anti-Corrosion Properties"; 1 page; NKK Corporation, Tokyo, Japan.

C-II—For New Transportation System; Nippon Steel; 4 pages.

"Butting—Bimetal Corrosion Resistant Pipes"; The Website for the Chemicals Industry; 2 pages.

"Use of new technology in Bintang gas development project"; PETROMIN May/Jun. 2003; pp. 14-16.

Butting Produkt—Butting Bimetal Pipes; www.butting.de; BUTTING GmbH & Co. KG; 6 pages.

WELDABLE CONDUIT METHOD OF FORMING

CROSS-REFERENCE TO RELATED APPLICATION

This application is a continuation-in-part of prior, U.S. patent application Ser. No. 10/616,014 filed on Jul. 9, 2003 now abandoned.

BACKGROUND OF THE INVENTION

1. Field of the Invention

The present invention relates to the field of pipe connections. More particularly, the present invention relates to the field of welded pipe connections normally useful in the oil and gas production, and refining and transportation industries, as well as flanged pipe connections normally useful in the chemical plant industry.

2. Background of the Related Art

Tubular goods, such as pipe used to transport oil and gas and products thereof, must be capable of withstanding the corrosive and/or erosive attributes of materials passing therethrough without failure. Such pipe is commonly manufactured from alloy steels which have insufficient anti-corrosive and/or anti-erosive properties to withstand attack from the gasses and liquids which are passed therethrough. Therefore, the interior regions of these pipes are commonly coated with protective materials, such as thin polymer based coatings or cement based liners, which form a protective barrier between the pipe material and the materials passing through the pipe. Where the pipe may be continually exposed to highly corrosive environments, such as in chemical plants where hydrofluoric or hydrochloric acid might be flowed through the pipe, the protective barrier may be constructed of a tubular PTFE based material, such as a PTFE based material sold by DuPont Corporation Tefzel®, or with other erosion or corrosion resistant materials in tubular form that extend the length of the interior diameter of the pipe.

Pipe used to transport oil, gas, and their products is typically configured in lengths of up to approximately 60 feet, and more typically at lengths of less than 45 feet. Therefore, to span any substantial distance using this pipe, the individual lengths of pipe must be connected end to end. In the oil and gas transportation industry, the most common method of connecting the individual lengths of pipe is by welding their ends together. Welding of the pipe ends presents several pipe material protection problems. First, where the pipe is protected by a thin polymer coating, the heat generated during welding destroys the coating adjacent the weld joint. This exposes the pipe material, and the weld, to the corrosive and erosive fluids passing through the pipe. Therefore, the weld area, and the pipe adjacent the weld, must be supplementally protected from the erosive and/or corrosive pipe environment.

One method of protecting the weld connection from the material flowing through the pipe is to apply a protective coating to the interior of the weld connection after welding. After several pipe lengths have been welded together, a re-coating pig is sent down the pipe to re-coat the weld joint in-situ. This in-situ re-coating is expensive and time consuming.

Another method of protecting the area of the pipe adjacent a weld employs an intermediate insert which fits into the pipe adjacent a weld joint to form a physical barrier between the weld and the materials passing through the pipe. One such insert is shown in U.S. Pat. No. 5,219,187, by Mikitka, wherein the insert is configured as an internally coated coupling provided in a supplemental pipe segment, which supplemental pipe segment is welded to one end of a pipe. The coupling is integrally provided in the pipe segment, preferably covers the entire inner diameter of the pipe segment, and also extends outwardly from the free end of the pipe segment when the pipe segment is welded to the pipe. To connect the length of pipe with the coupling projecting therefrom into an adjacent pipe, the coupling is inserted into the end of the adjacent pipe, and the free end of the pipe segment is welded to the end of the adjacent pipe. When the pipe segment and adjacent pipe end are welded together, a portion of the protective coatings on the interior of the pipe and coupling are destroyed by the heat of the weld. Additionally, if the coupling is damaged at any point, the entire pipe to which it is attached is rendered useless.

Another insert for protecting pipe ends at weld joints is disclosed in U.S. Pat. No. 4,913,465, by Abbema. In that reference, a metallic coupling is placed into the ends of two adjacent pipes prior to welding the adjacent ends of the pipe together. The coupling includes a circumferential recessed area, which aligns under the weld as the weld is formed, and a seal disposed on either side of the recessed area. An insulative wrap and a plurality of heat retaining strips are received in the recessed area. The heat retaining strips span the recessed area and contact the mass of the metallic coupling at either end of the strip. Each strip also includes alignment bosses thereon, to which the pipe ends are physically engaged to provide a pre-selected gap between adjacent pipe ends and to center the coupling within the two pipe ends. These alignment bosses are sacrificed into the weld during welding.

The connection system disclosed in Abbema has several limitations. First, the coupling is metallic and therefore transfers a substantial amount of heat from the welding operation along the inner diameter of the pipe. This heat can destroy the interior protective coating on the pipe at a substantial distance inwardly of the pipe end. In an attempt to mask the area of the pipe where the protective layer is destroyed, the coupling is configured as a spanning element, i.e., it spans the burned or otherwise destroyed portion of the interior pipe coating adjacent the pipe ends. Additionally, the coupling itself is also subject to corrosion or erosion when exposed to the pipe liquids or gasses. In an attempt to obviate any corrosion or erosion problem with the coupling, a secondary protective coating is applied, before the coupling is inserted into the pipe ends, to the inner diameter of the coupling and to the portion of the outer diameter of the coupling adjacent the ends of the coupling. Also, a mastic is applied to the inner diameter of the pipe. The mastic lubricates the coupling upon insertion of the coupling into the pipe end and provides a secondary coating barrier if the coating on the outer diameter of the coupling is damaged. However, during welding operations, the heat of welding will travel through the heat retaining straps and into the coupling at discrete spots around the circumference of the coupling, and this heat will transfer through the coupling and create localized burned areas of protective coating at the inner diameter of the coupling. The mastic will also be partially destroyed by heat during welding operations, and the mastic may become disengaged from the coupling ends and expose any defects in the coupling coating to the erosive and corrosive pipe environment. Further, the seal configuration on the coupling does not fully protect the weld area from the erosive and/or corrosive conditions within the pipe. The seal provided on either side of the recess cannot span the possible gaps which may be present as a result of the tolerance on the pipe inner diameter. Therefore, when the pipe inner diameter is at the high end of the acceptable tolerance, the seal may not engage the pipe. Likewise, when the pipe inner diameter is at the low side of the tolerance, the seal may be destroyed as the coupling is shoved into the pipe end, particularly if the seal is configured for the high end of the inner diameter tolerance. In either case, fluids passing through the pipe may enter the annular area between the coupling and the pipe. Additionally, the mastic may interfere with the seating of the seals against the inner diameter of the pipe, which will allow pipe liquids and gasses to leach between the coupling and the pipe. Finally, the bosses used to align the pipe ends and maintain the proper weld gap may, when sacrificially incorporated into the weld, reduce the strength of the weld and thereby reduce the effectiveness of the weld connection.

The corrosive nature of some fluids also limits the utility of pipelines or runs wherein the individual pipe segments are welded together. Pipelines and pipe runs used in chemical plant applications also have erosive and/or corrosive fluids passing therethrough, but are typically constructed differently than as described above for welded pipe connection. Pipe used in chemical plant applications, although readily available in lengths of up to 40 feet, is typically configured in lengths of only 10 feet, and occasionally in lengths of up to 20 feet. The limiting factor on pipe length in chemical plant applications is the need to provide a barrier between the steel or other material forming the pipe, and the potentially corrosive or erosive materials flowed through the pipe. Standard industry practice is to provide this barrier by pulling a length of protective tubing, such as the abovementioned Tefzel® material, through the pipe segments to form a barrier between the pipe material and the material flowed through the pipe. The pipe ends cannot be welded where such an inner barrier material is used, because the heat of welding the pipe will destroy the barrier material, and there is no convenient means for connecting the lengths of protective barrier material tubing extending within the pipe that is capable of withstanding the forces generated within the barrier material as materials are flowed therethrough. Therefore, to connect adjacent lengths of this pipe, the individual pipe ends are provided with flanges, and the end of the tubular barrier material within each length of pipe is flared outwardly to be received between the flanges. By connecting adjacent pipe flanges, the ends of each segment of the tubular barrier are secured between the flanges, and a continuous barrier having a circumferential joint at the flanges is provided.

The flange method of joining adjacent lengths of pipe, and the inner barrier material, is expensive, time consuming, and subject to failure. One primary failure mode which occurs with this connection system is a stress fracture in the barrier material where the barrier material is flanged outwardly to be received between the flanges of the adjacent pipe ends. Because the barrier material typically has a higher coefficient of thermal expansion than the pipe material, the barrier material expands and contracts as the pipe thermally cycles in use. As the tubular barrier is fixed only at its ends, i.e., at the flanges, the tubular barrier has some freedom to move except at the flanges, and thus the stress caused by thermal expansion of the barrier material is highest where the tubular barrier is flared outwardly to be joined in the flange. Thus, the tubular barrier will crack at this location, necessitating removal of the pipe and replacement of the tubular barrier material. This commonly requires disassembly of a substantial length of the pipe line extending from the failure point to an elbow, or other location in the pipe run.

The second major problem associated with the interconnection of the tubular barrier material at a flange connection also relates to the higher coefficient of thermal expansion of the tubular barrier as compared to the pipe material. The longer the length of the tubular barrier, the greater the total linear expansion or contraction of the tubular barrier over a given temperature range. Pipe lengths in the chemical processing industry are generally limited to 20 foot lengths, because longer lengths would create excessive thermal expansion and cause the tubular barrier to break at the aforementioned flange position or to buckle in the pipe.

A third problem associated with the connection of the tubular barrier material between the pipe flanges is the difficulty of forming the connection in all seasons and environments. The tubular barrier material has a memory and tends to return to its final shape after being flared to be received in the flange, which return to the initial configuration occurs fastest at high temperatures. At low temperatures, the formability of the material is low, so the time needed to flare the tubing is increased, and the brittleness is greater, so the chance of breaking the tubing while forming the flare is increased. These factors add up to provide a connection that is difficult to form.

A fourth problem associated with flanged pipe connection is material fabrication and availability. Flanged pipe is not readily available in different pipe lengths for all pipe diameters, and the pipe line or pipe run fabricator typically has to weld flanges onto the pipe on site, or special order flanged pipe of various lengths, to provide the major runs of pipe on the job site. In either case, the flanged pipe is more expensive to provide for a given pipe line or pipe run, than a welded pipe line or pipe run.

SUMMARY OF THE INVENTION

The present invention provides for the interconnecting by welding of tubular members employed for transporting corrosive and/or erosive fluids. The terms "fluid" and "fluids" are used herein to include gases, liquids and/or slurries. In one aspect, the invention provides a method of forming a conduit assembly. A pair of weldable conduits are each formed in a process that includes the step of positioning a tube formed of a material having desirable properties (e.g., resistance to corrosion and/or erosion) within a pipe formed of a commonly weldable material such that one end of the tube is aligned with one end of the pipe. The tube has an outer diameter slightly less than the inner diameter of the pipe. The tube is affixed to the pipe by connecting the aligned ends thereof, and the pipe is compressed in a reducing operation so that the inner diameter of the pipe is reduced to a diameter that is less than or equal to the outer diameter of the tube.

The so-formed conduits are positioned in opposing relation, and an end of each of the conduits is placed about the respective opposing ends of a coupling for welded interconnection of the conduits. The coupling contains a cylindrical body formed of the same material as the tubes of the conduits. The body has an outer diameter that is slightly less than the inner diameter of the tubes of the conduits, and an inner diameter that varies to form a taper at each end of the body. The body further contains a circumferential recess intermediate the ends of the body, and a ring formed of the same material as the tubes of the conduits. The ring is positioned within the recess of the body and has a circumferential stop means for limiting movement of the ends of the body within the respective ends of the conduits by the ends of the conduits abutting the stop means. At least one circumferential seal is positioned intermediate the recess and each of the tapered ends of the body for sealing the interconnected conduits.

An insulator is preferably positioned in the recess between the ring and the body for inhibiting the transfer of heat produced by welding the ends of the conduits together, although the insulator is not essential in all embodiments.

The ends of the conduits are temporarily affixed to one another in the region of the circumferential stop means of the coupling ring. The circumferential stop means of the ring is removed to clear an annular pathway for welded interconnection of the ends of the conduits, and the ends of the conduits are welded together in the annular pathway to complete the interconnection.

It is preferred that the pipe of each conduit is formed of a carbon steel, such as a steel material having an API designation of 5L.

It is also preferred that the tube of each conduit is formed of (i.e., includes to a substantial degree) an alloy containing one or more materials selected from the group of chromium, molybdenum, nickel, iron, copper, and titanium. In particular embodiments, the tube of each conduit is formed of an alloy selected from the group of stainless steel, hastelloy, inconel, incoloy, and monel.

It is further preferred that the tube of each conduit be affixed to the pipe prior to the reducing operation by tack welding or clamping the aligned ends thereof together.

It is further preferred that the reducing operation includes rolling the pipe of each conduit or forcing the pipe of each conduit through a die.

The inventive method enables another aspect of the present invention, in the form of a weldable conduit assembly. The assembly includes a pair of opposing composite conduits each having an inner tube formed of a material having desirable properties (e.g., resistance to corrosion and/or erosion), and an outer pipe formed of a commonly weldable material. The pipe encircles and is compressed upon the tube such that the inner surface of the pipe engages the outer surface of the tube within each conduit. A coupling is provided for welded interconnection of the opposing conduits, and employs a cylindrical body formed of the same material as the tubes of the conduits. The coupling body has an outer diameter that is slightly less than the inner diameter of the tubes. In a preferred embodiment, the inner diameter of the body varies to form a taper at each end of the body. A circumferential recess is formed in the body intermediate the ends of the body, and a ring formed of the same material as the tubes of the conduits is positioned within the recess of the body. The ring has a circumferential stop means for limiting movement of the ends of the body within the respective ends of the conduits by the ends of the conduits abutting the stop means. At least one circumferential seal is disposed intermediate the recess and each of the tapered ends of the body for sealing the interconnected conduits.

In a presently preferred embodiment, an insulator is positioned in the recess between the ring and the body for inhibiting the transfer of heat produced by welding the ends of the conduits together.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1A:
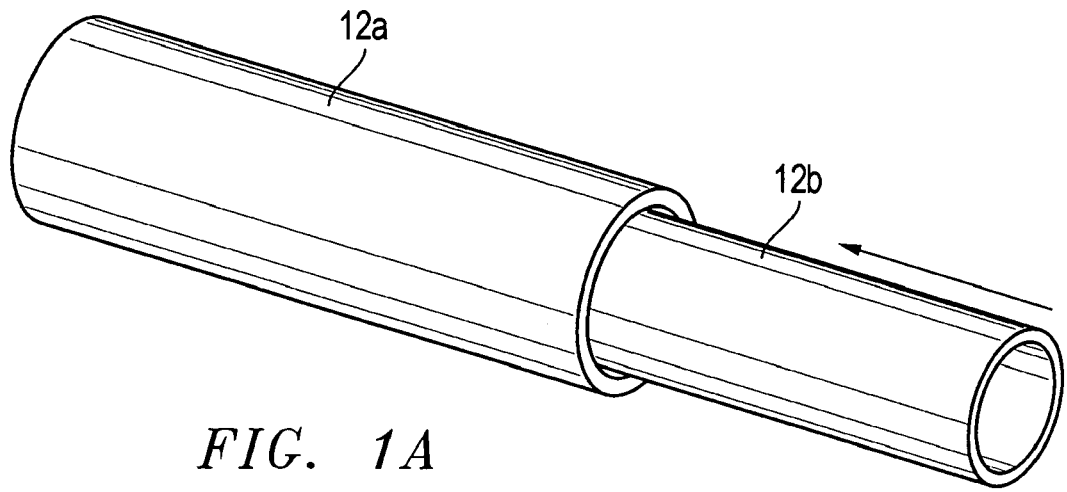
FIGS. 1A, 1B, and 1C illustrate sequential steps for forming a weldable conduit in accordance with one aspect of the present invention.

The present invention provides for the interconnecting by welding or flanged connection of tubular members employed for transporting corrosive and/or erosive fluids including gases, liquids or slurries. In one aspect, the invention provides a method of forming a weldable tubular member, referred to hereinafter as a "conduit." With reference first to FIGS. 1A, 1B, and 1C, the inventive method includes the step of positioning a tube 12b formed of a material having desirable properties (e.g., resistance to corrosion and/or erosion) within a pipe 12a formed of a commonly weldable material. The tube 12b is preferably formed of (i.e., includes to a substantial degree) an alloy containing one or more materials selected from the group of chromium, molybdenum, nickel, iron, copper, and titanium, and, in certain embodiments, the tube is formed of an alloy selected from the group of stainless steel, hastelloy, inconel, incoloy, and monel. The pipe 12a is preferably formed of a carbon steel, such as a steel material having an API designation of 5L or an ASTM designation of A106, among others. The pipe 12a is formed in diameter sizes slightly larger than standard body wall sizes (e.g., schedule 40 or schedule 80), as explained further below. The particular material selection for both the pipe and tube sections will of course be dictated by the environment and the fluids being transported.

One end 12f of the tube 12b is aligned with one end 12e of the pipe 12a. The tube has an outer diameter at 12h that is slightly less than the inner diameter of the pipe at 12g, defining an annular gap 13 therebetween. The tube is affixed to the pipe by connecting the aligned ends 12e, 12f thereof by tack welding 15. Alternatively, the tube and pipe may be affixed at their aligned ends by clamping or other suitable means as is known to those of ordinary skill in the art.

Figure 1B:
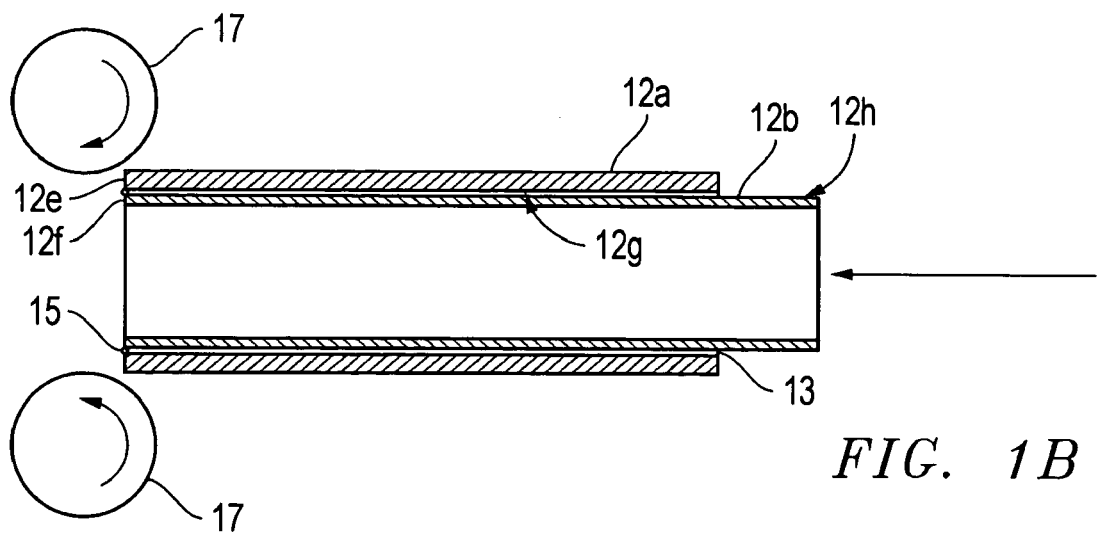
Figure 1C:
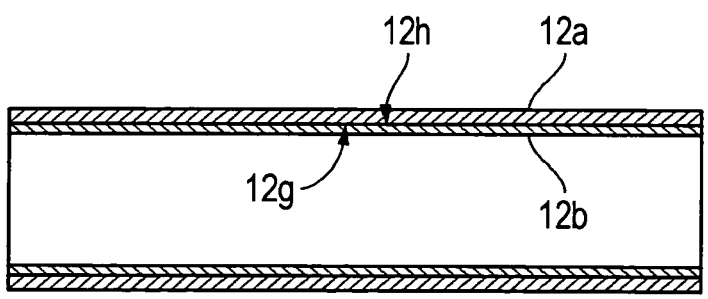

The pipe is then compressed in a reducing operation so that the inner diameter of the pipe is reduced to a diameter that is less than or equal to the outer diameter of the tube, as indicated in FIGS. 1B-1C. The reducing operation preferably includes rolling the pipe via rollers 17, but may alternatively include forcing the pipe through a die (not shown). Prior to the reducing operation, the pipe 12a is significantly shorter than the tube 12b, as shown in FIG. 1B. The reducing operation has the effect of elongating the pipe 12a as the diameter of the pipe is reduced, as illustrated by the resulting composite conduit shown in FIG. 1C. As mentioned above, the diameter of the pipe section 12a is initially slightly larger than standard body wall diameters, such that the reducing operation reduces the pipe diameter to match standard body wall diameters. After completion of the reducing operation, the adjoined pipe and tube are cut at one or both ends to ensure the resulting conduit has a uniform wall thickness along its length.

The resulting weldable conduit has an inner tube 12b formed of a material having desirable properties, as described above, and an outer pipe formed of a commonly weldable material, as also described above. The pipe 12a encircles and is compressed upon the tube 12b such that the inner surface 12g of the pipe engages the outer surface 12h of the tube.

Figure 2A:
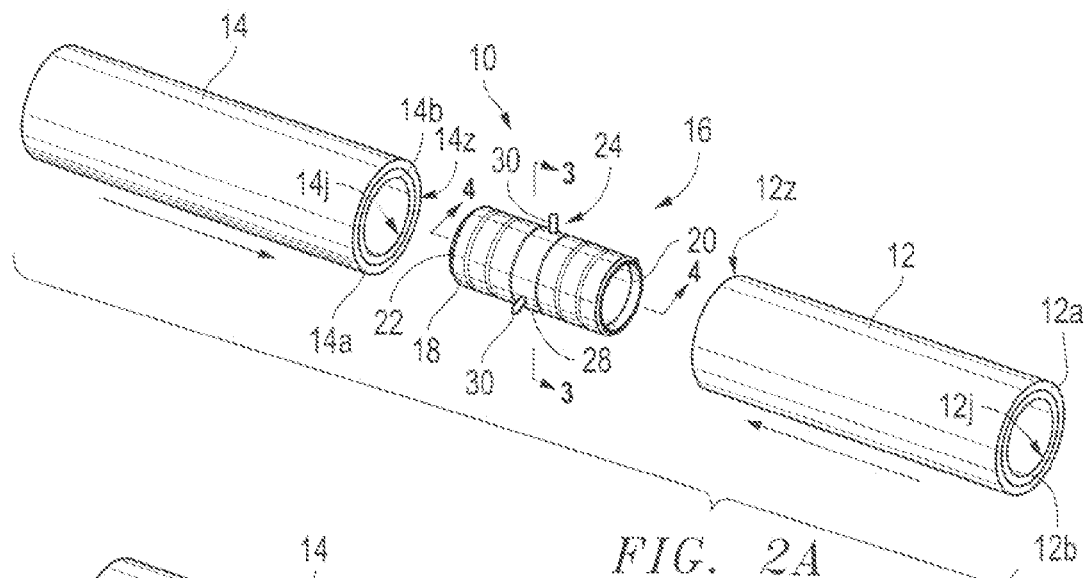
FIGS. 2A, 2B, and 2C illustrate sequential steps for forming a welded conduit assembly, including two conduits interconnected via a coupling, in accordance with another aspect of the present invention.
Figure 2B:
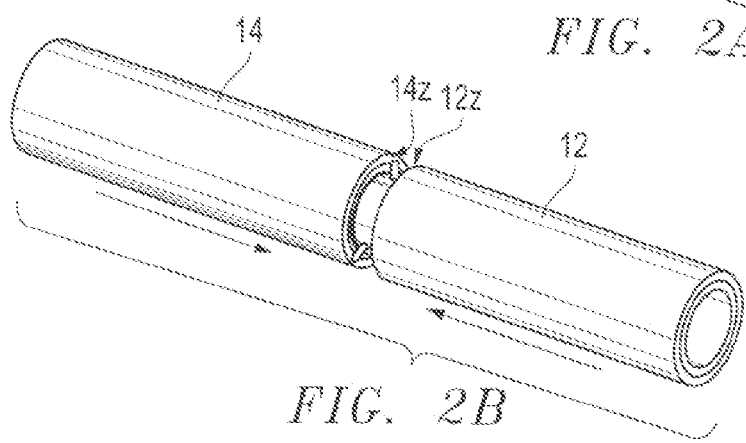
Figure 2C:
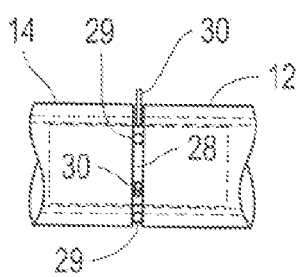

A further aspect of the present invention provides a method of forming a conduit assembly, and is shown in FIGS. 2A, 2B, and 2C. More particularly, the conduit assembly according to the present invention is known in the relevant art as a continuous corrosion barrier, and is generally referenced as 10 in FIG. 2A. The assembly is based upon a pair of weldable conduits 12, 14, each formed in a process as described above with reference to FIGS. 1A-1C. The so-formed conduits are positioned in opposing relation, and an end 12z, 14z of each of the conduits 12, 14 is placed about the respective opposing ends 20, 22 of a coupling 16 for welded interconnection of the conduits 12, 14.

The coupling 16 contains a cylindrical housing or body 18 formed of the same material as the tubes 12b, 14b of the conduits 12, 14. The coupling body 18 has an outer surface, indicated at 40 in FIGS. 3-4, having a diameter that is slightly less than the inner diameter 12j, 14j of the conduit tubes 12b, 14b. The coupling body 18 further has an inner diameter that varies to form a taper 36 at each end of the body, as shown in FIG. 4. The body 18 further contains a circumferential recess 44 intermediate the ends 20, 22 of the body, and a ring 28 formed of the same material as the tubes 12b, 14b of the conduits 12, 14. The ring 28 is positioned within the recess 44 of the body and has a circumferential stop means, such as a plurality of circumferentially-spaced spacer pins 30, for limiting movement of the ends 20, 22 of the coupling body 18 within the respective ends 12z, 14z of the conduits 12, 14 by the ends of the conduits abutting the stop means 30. A thermal insulator 54 is preferably positioned in the recess between the ring 28 and the body 18 for inhibiting the transfer of heat produced by welding the ends of the conduits together, and at least one circumferential seal 50—and preferably a second circumferential seal 52—is positioned intermediate the recess 44 and each of the tapered ends 20, 22 of the body 18 for sealing the interconnected conduits 12, 14.

Once positioned in abutment with stop means 30, the ends 12z, 14z of the conduits are temporarily affixed to one another, such as by tack welding 29 or other means including clamping, in the region of the circumferential stop means 30 of the coupling ring 28 (see FIG. 2C). The circumferential stop means 30 of the ring is then removed to clear an annular pathway 111, indicated generally at 111 in FIG. 6, for reliable welded interconnection of the ends 12z, 14z of the conduits 12, 14. It is preferred that the ends 12z, 14z be beveled to broaden the cross-section of the pathway, and further promote a strong, reliable welded connection. The ends 12z, 14z of the conduits 12, 14 may then be welded together in the annular pathway to complete the interconnection, thereby blending the coupling ring 28 with the conduit ends to ensure the coupling 16 does not move during fluid transport, cleaning, or inspection operations.

The resulting conduit assembly includes a pair of opposing composite conduits 12, 14 each having an inner tube 12b, 14b and an outer pipe 12a, 14a as described herein. The pipe 12a, 14a encircles and is compressed upon the tube 12b, 14b such that the inner surface of the pipe engages the outer surface of the tube within each conduit 12, 14. The coupling 16 provides for welded interconnection of the opposing conduits in such a manner that the conduits 12, 14 may be welded at their respective ends 12z, 14z without compromising the ability of the conduits 12, 14 to reliably transport corrosive and/or erosive fluids.

Furthermore, the use of common materials (e.g., stainless steel) for the ring 28 and the tubes 12b, 14b results in the entire conduit assembly fluid pathway having common corrosion and erosion-resistant characteristics. This improves the ability of the conduit assembly to withstand the failure of one or both o-rings 50, 52, since the welded fusion of the tubes 12b, 14b to the ring 28 makes it impossible for the transported fluid to contact any surface other than the surfaces of these members—which employ material(s) specifically selected for corrosion and erosion resistance.

Figure 3:
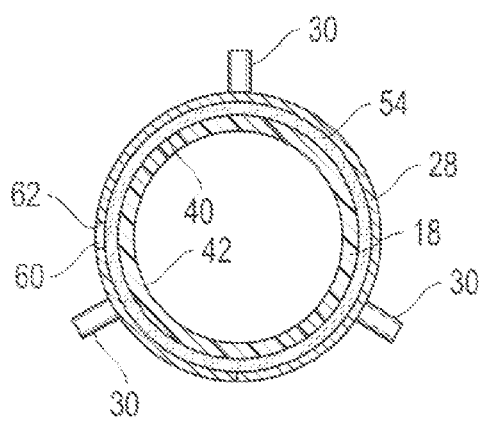
FIG. 3 is a sectional view of the coupling of FIG. 2A at section 3-3.
Figure 4:
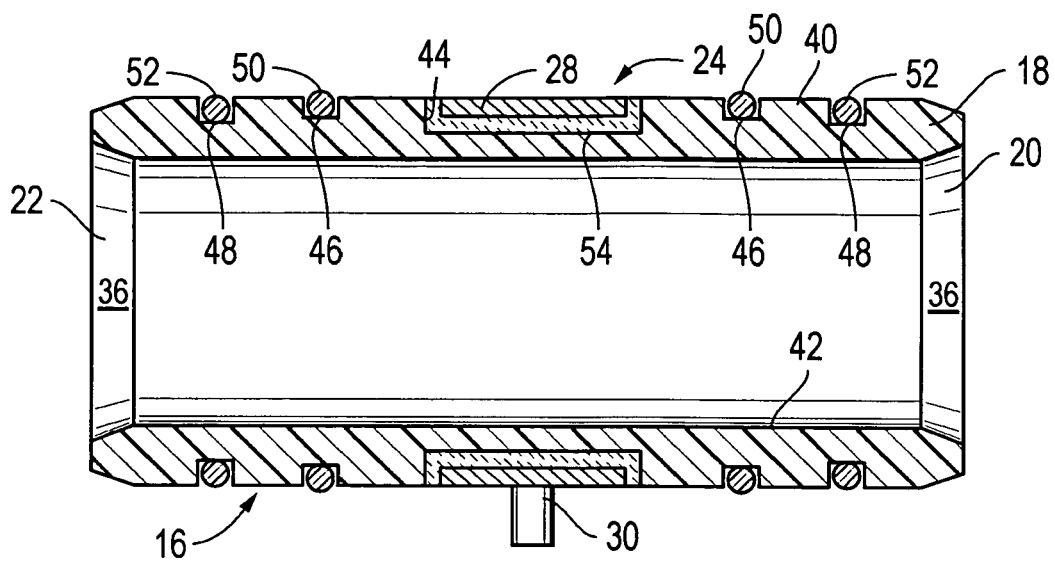
FIG. 4 is a further sectional view of the coupling of FIG. 2A at section 4-4.

Referring now to FIGS. 2A, 3, and 4, the conduit 16 will now be described in greater detail. The illustrated embodiment of the conduit 16 is particularly useful, but not limited to, pipeline applications wherein exotic materials such as stainless steel, hastelloy, inconel, incoloy, and monel have previously been selected for the entire make-up of the pipeline tubular sections. The use of a composite conduit, as describe herein, in combination with the coupling 16 results in significant cost savings (up to 40%) compared to such previously known methods and equipment.

The coupling 16 includes a generally right circular cylindrical body 18, having opposed open ends 20, 22, and a central shielding portion 24, which is partially received within the ends 12z, 14z of the conduits 12, 14 when the ends of the coupling 16 are fully received into the conduits 12, 14 (see also FIG. 2C). The central shielding portion 24 of the conduit 16 preferably includes a ring member 28, having a circumferential stop means in the form of a plurality, preferably three to six, of alignment spacers 30 circumferentially spaced thereabout and extending outwardly therefrom. The spacers 30 are preferably attached to the ring 28 by tack welding, although other attachment means, such as forming the connection of the spacer 30 to the ring 28 as a rivet, or as a simple mechanical connection capable of being easily broken, may be provided.

When the coupling 16 is properly positioned in the conduit ends 12z, 14z, the conduit ends 12z, 14z contact, or are in close proximity to, the circumferential stop means 30. Preferably, the circumferential stop means 30 are configured as spacer pins, which extend outwardly from the outer diameter of the ring 28, but the circumferential stop means may, in various embodiments, be configured as balls, protuberances, projections, ridges (continuous or segmented), bosses, and other functionally equivalent structure.

During a welding operation, particularly a multiple pass welding operation, substantial heat is generated which will increase the temperature of the conduit ends 12z, 14z above the burning or transformation temperature of the thin protective coating maintained on the interior surface of previously known pipe sections and metallic couplings. When the areas of the coating on the inside of such prior art pipes and couplings are destroyed during welding, the underlying pipe material and coupling material will be exposed to the gases or liquids which are passed through the pipe. This can cause the pipe or the coupling to fail. Therefore, to properly protect the weld joint, the coupling 16 should provide a barrier to prevent the materials such as liquids or gases from contacting, and then eroding and/or corroding, the exposed areas of the pipe, and also provide a non-compromised inner surface on the coupling 16 to protect the weld and the coupling 16 from corrosion and/or erosion from the materials passing through the pipe. The composite conduit and coupling assembly of the present invention address such requirements. The inner tube of the composite conduit, in particular, serves as an effective barrier preventing corrosive/erosive materials from attacking the outer pipe of the conduit and/or the weld interconnecting adjacent conduits.

Referring again to FIG. 4, the coupling 16 is a generally tubular member, having an outer circumferential surface 40 with a diameter slightly less than the minimum inner diameter tolerance of the conduits 12, 14 into which the coupling 16 is to be inserted. This ensures that the coupling 16 may be inserted into any conduit ends 12z, 14z which are within the tolerance range for the specific conduit size. It should be appreciated that multiple sizes of couplings 16, corresponding to the numerous available nominal conduit diameters, may be provided to cover the available ranges of conduit sizes which are connected by welding. The inner circumferential surface 42 of the coupling has a diameter sized to allow an inspection pig, or other such pipe cleaning or flow volume separating mechanism, to pass therethrough. The ends 20, 22 of the coupling 16 preferably include a tapered inner surface 36, extending from the ends 20, 22 of the coupling 16 to a position interiorly of the coupling ends 20, 22. The tapered inner surface 36 is provided to help prevent a pig or other device from engaging the end of the coupling 16 and dislodging it, to prevent damage to the pig, and to increase the flowability of gases and liquids through conduit by promoting laminar fluid flow at the conduit joints.

The outer surface 40 of the coupling 16 includes a central alignment recess 44 located at the approximate longitudinal center of the coupling 16 in which the ring 28 is at least partially received, and a pair of seal grooves, 46, 48 extending circumferentially about the coupling 16 on either side of the alignment recess 44. The grooves 46 on the respective sides of the alignment recess 44 are located equidistant the sides of the alignment recess and have a depth to accommodate a first seal 50, such as an o-ring, therein. The first seal 50 is preferably a high temperature seal configured from a high temperature material, such as silicone or viton, capable of withstanding a temperature of approximately 300 degrees Fahrenheit. The second grooves 48 are positioned between the first grooves 46 and the adjacent ends 20 or 22 of the coupling 16, and are sized at a depth to receive a second seal 52, such as an o-ring, therein. The second seal 52 may be any material capable of withstanding the corrosive and/or erosive environment created by the fluids being transported. The seals 50, 52 preferably have the same cross section, and therefore the radial extent of the seals from the outer surface 40 of the coupling 16 will depend on the depth of the grooves 46 and 48. In some embodiments, differing grove depths may be desirable to compensate for the spacing tolerance between the outer diameter of the coupling 16 and the inner diameter of the conduits 12, 14 being interconnected. However, the need for such differing groove depths is eliminated by the present invention's use of common materials for the conduit tubes 12b, 14b and the coupling body 18, since such materials lend themselves to precise machining and small tolerances.

If the coupling 16 will be exposed to high pressures within the pipe, backup rings may be provided in the grooves 46, 48. These rings are preferably configured from a high temperature conformable material such as Viton. The grooves 46, 48 are spaced a sufficient distance from the weld to ensure that the temperatures at the seals 50, 52 disposed therein do not exceed the limit temperatures of the seal material therein. It has been found that the first grooves 46 may be located less than one inch from the center of the weld and the second grooves 48 may be disposed less than two inches from the center of the weld without the seals 50, 52 experiencing temperatures that exceed the above-described limits when the conduit ends 12z, 14z are welded together.

In addition to sealing the weld area of the continuous corrosion barrier 10, the coupling 16 is configured to provide a thermal shield to limit the passage of heat from the weld into the inner diameter of the coupling 16. To limit the heat transfer from the weld, the alignment recess 44 includes a heat shielding member 54 received therein. The heat shielding member is preferably a high temperature, high purity material, such as a ceramic tape or ceramic paper having a melting point of approximately 3200 degrees Fahrenheit. The heat shielding member 54 protects the coupling 16 from direct burning by the weld and insulates the coupling 16 from the heat generated by the weld. A ring member 28 is also received in the alignment recess 44, over the heat shielding member 54. The ring member 28 is preferably a metallic ring formed of the same material as the conduit tubes 12b, 14b that supports the circumferential stop means 30 used to align the conduit ends 12z, 14z for welding, and to properly position the coupling 16 in the conduit ends 12z, 14z, as well as prevent movement of the coupling during fluid transport, conduit, cleaning, or inspection operations.

However, the ring 28 also tends to transfer heat from the weld area. To limit the heat transfer from the ring member 28 into the body of the coupling 16, the width of the ring member 28 is preferably slightly smaller than the width of the alignment recess 44, and the insulative thermal shield material preferably extends between the base and sides of the ring member 28 and the base and sides of the alignment recess 44. By isolating the ring member from direct contact with the mass of the coupling 16, the amount of heat transferred from the weld to the coupling 16 is reduced. This reduces the potential peak temperature experienced at the inner circumferential 42 of the coupling 16 to a level below that which would detrimentally affect the ability of the material exposed at the inner circumferential surface 42 of the coupling 16 to resist corrosion and/or erosion. Those skilled in the art will appreciate, however, that the composite conduit described herein will, in some applications, render the thermal/heat shielding member redundant.

Figure 5:
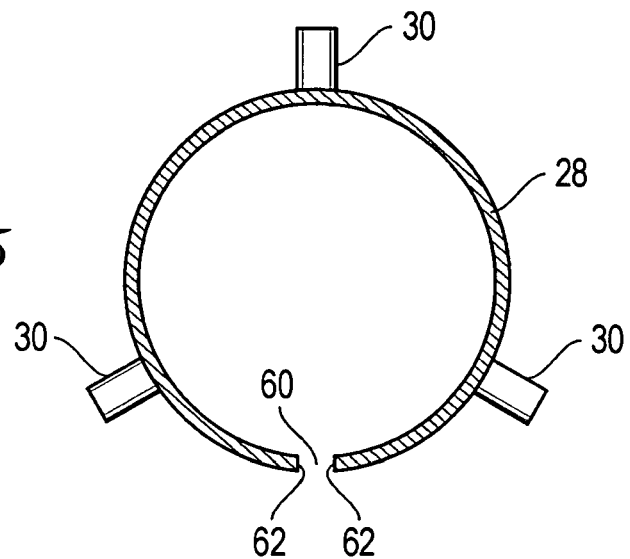
FIG. 5 is an end view of a coupling ring for use with the coupling of FIGS. 2A, 3, and 4.

Referring now to FIGS. 3 and 5, the ring member 28 is a preferably a loop of material, formed substantially into a ring prior to being placed onto the coupling 16. Preferably, the loop is formed from the same material as the conduit's outer pipe material. The loop includes a gap 60 formed between the opposed ends 62 of the loop. When the loop is located over the coupling 16, the opposed ends 62 are preferably tack welded together to secure the ring member 28 in the alignment recess 44. Alternatively, the ring member 28 may be provided with a gap which allows the ring member 28 to spring out and into contact with the inner diameter of the conduits 12, 14. Thus, when the conduit ends 12z, 14z are welded together, the ring 28 will become welded to the inside of the pipe ends 12z, 14z. When the ring member 28 is formed over the coupling 16 by tack welding the ends 62 of the ring member 28 together, the ring member 28 becomes locked into position in the alignment recess 44. Thus, once the ring member 28 is welded in place within the conduit ends 12z, 14z, the coupling 16 is then locked in place in the conduit ends. Thus, the alignment recess 44 serves to align the ring member 28 and the circumferential stop means 30 (e.g., spacer pins) extending therefrom, at a specific location with respect to the ends 20, 22 of the coupling 16.

To prepare a coupling joint using the continuous corrosion barrier 10 of the present invention, the coupling 16 is first prepared by compressing the split ring member 28 into the alignment recess 44 over the insulative member 54 (if it is required), and the ends 62 of the ring 28 are tack welded together. This may be performed on site, or the ring member 28 may be tack welded in place when the coupling is manufactured, or at intermediate steps in between.

With reference also to FIGS. 2A-2C, the coupling 16, with the seals 50, 52, the insulative member 54, and the ring member 28 thereon, is loaded into the first pipe end 12z until the circumferential stop means 30 are in contact with, or immediately adjacent, the pipe end 12z. Then, the second pipe end 14z is manipulated over the coupling 16 until the conduit end 14z contacts the circumferential stop means 30. At this point, the conduit ends 12z, 14z are tack welded together at multiple discrete locations between the circumferential stop means 30 without incorporating the circumferential stop means into the weld. For example, if three spacer pins 30 are used, three tack welds 29 are located to connect the conduit ends 12z, 14z midway between the three circumferential stop means 30. The circumferential stop means are then removed, preferably by hitting the portion thereof extending outwardly beyond the conduit ends 12z, 14z with a hammer. Then the weld is completed in multiple passes so as to fuse the ring 28 to the tubes 12b, 14b and the pipes 12a, 14a to each other. During welding, a small gap is maintained to allow air to vent from the area between the coupling 16 and the conduit ends 12z, 14z, and the gap is closed during the welding process.

Figure 6:
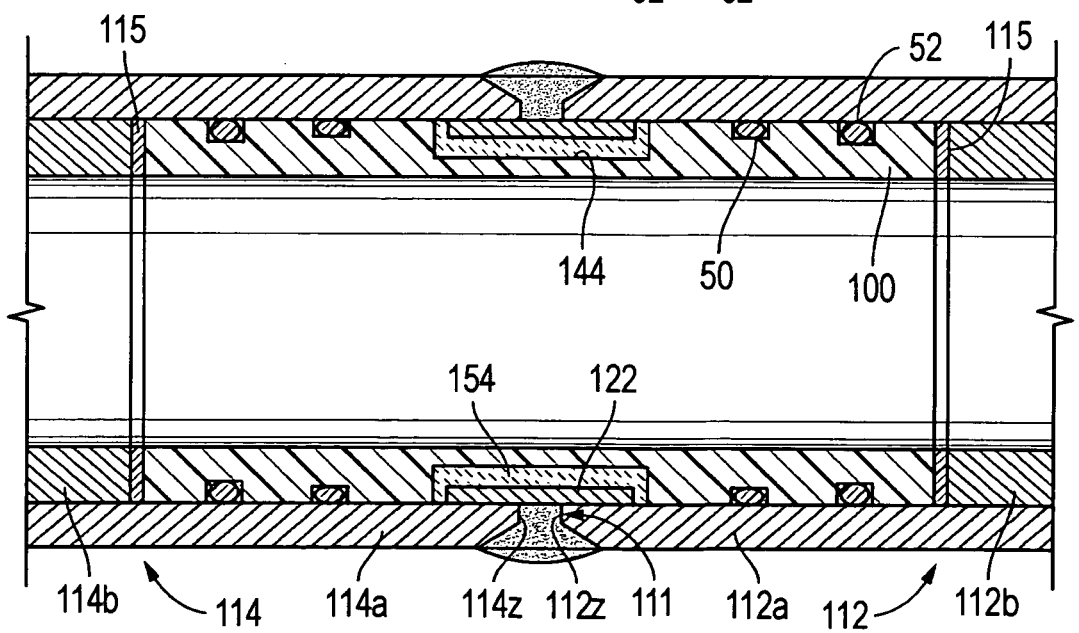
FIG. 6 is a sectional view of an alternative embodiment of the coupling of FIG. 4.

Referring now to FIG. 6, an alternative embodiment of the coupling is shown. In this embodiment, the coupling 100 is configured to be received into composite conduit segments 112, 114 having outer pipe segments 112a, 114a, and inner tube segments 112b, 114b, according to the methods described above. The coupling 100 is identical to the configuration of coupling 16, except as specifically noted herein. The tubes 112b, 14b are cut back a specific distance from the ends 112z, 114z of the conduits 112, 114 by an internal cutting process that is known in the relevant art. The cut-back distance corresponds to the distance which the coupling 100 extends inwardly into the conduit ends 112z, 114z, such that a space will remain between the ends 112z, 114z of the conduit when the coupling 100 is fully received in the conduit ends. This space corresponds with the gap between the conduit ends that is necessary for a proper weld. To ensure that the weld is not exposed to the transported liquids, gases, or slurries, seal rings 115 are preferably located between the ends 120, 122 of the coupling 100 and the ends of the tubes 112b, 114b within the conduits.

When the inner tube segments 112b, 114b are cut back to predetermined lengths, as in the embodiment of FIG. 6, the coupling 100 does not require the circumferential stop means 30. The tubes 112b, 114b, in cooperation with the coupling 100, establish the required gap between the conduit ends 112z, 114z for welding. Additionally, it is not essential that the above-described ring member be used, because the ends of the tubes 112b, 114b maintain the coupling 100 in position in the longitudinal direction of the conduits 112, 114.

However, the alignment recess 144, and an insulative member 154 therein, are used in certain applications to limit direct heat transfer from the weld into the coupling 100. Therefore, a ceramic or other insulative member 154 is received in alignment recess 144 to protect the coupling 100 from direct burning from the weld and to insulate the coupling 100 from the heat generated from the weld. The member 154 may be configured as a wrap or wraps of silica cloth, which is placed within the recessed area 144, or the material may be adhered to the sides of the recessed area 144, and formed to leave an air gap 122 between the insulative member 154 and the weld. Alternatively, the ring member and the circumferential stop means may be used with such conduits 112, 114, but, as long as the inner tubes 112b, 114b terminate within the pipe segments 112a, 114a at appropriate distances to properly align the coupling 100 in the conduits 112, 114, the ring member and the circumferential stop means are redundant.

Figure 7:
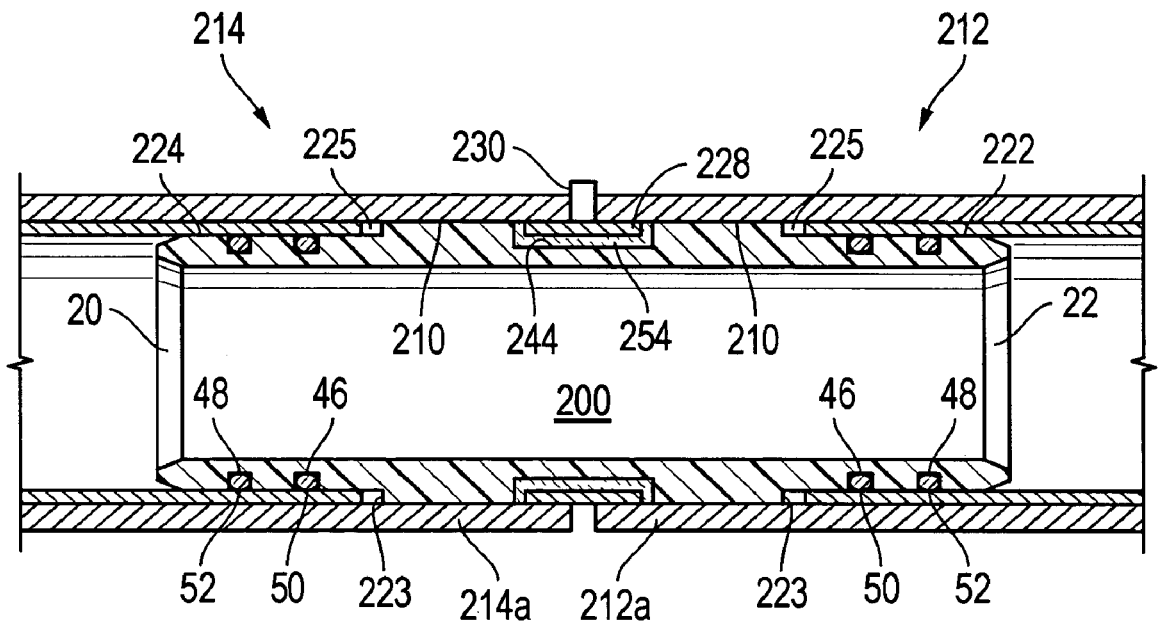
FIG. 7 is a sectional view of a further alternative embodiment of the coupling of FIG. 4 employed to form a welded corrosion-resistant conduit assembly.
Figure 8:
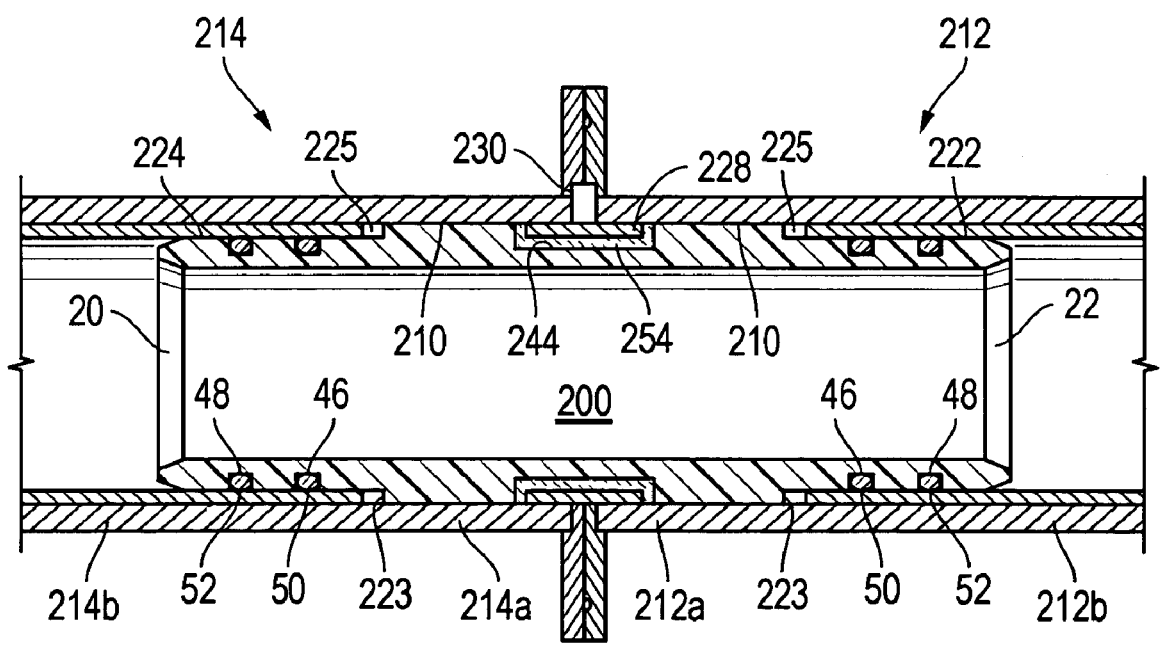
FIG. 8 is a sectional view of the coupling of the coupling of FIG. 7 employed to form a flanged corrosion-resistant conduit assembly.

Referring now to FIGS. 7 and 8, further alternative embodiments of the continuous corrosion barrier 10 of the present invention generally include a coupling 200 which is received in adjacent composite conduits 212, 214 for interconnection by welding (FIG. 7) and by flanged connection (FIG. 8). The composite conduits 212, 214 include outer pipes 212a, 214a and inner tubes 212b, 214b assembled as otherwise described herein. The tubes 212b, 214b provide corrosion protection for the interior wall of the pipes 212a, 214a where highly corrosive or erosive materials are present in the fluids transported via the conduits.

The coupling 200 is in all respects identical to the above described coupling 16, including, but not limited to, the materials used in the construction of the couplings 16 and in the circumferential stop means 30, except the opposed open ends 20, 22 of the coupling 200 include recesses 222, 224 which form minor diameter portions at each end of the coupling 200 which are received within the respective tubes 212b, 214b of the conduits 212, 214. Also, the ring member 228 of this embodiment is formed of the same material as the pipes 212a, 214a, rather than the same material as the tubes 212b, 214b, as described above for another embodiment. Where the coupling 200 is used in conjunction with a welded connection as shown in FIG. 7, the central shielding portion of the coupling 200 preferably includes the ring member 228 received over a thermal shielding member 254 in an alignment recess 244 as in coupling 16, having a circumferential stop means in the form of a plurality, preferably three or more, of alignment spacers 230 circumferentially spaced thereabout and extending outwardly therefrom. The spacers 230 are preferably attached to the ring 228 by tack welding, although other attachment means, such as forming the connection of the spacer 230 to the ring 228 as a rivet, or as a simple mechanical connection capable of being easily broken, may be provided.

When the coupling 200 is properly positioned in the ends of conduits 212, 214, the ends of outer pipes 212a, 214a contact, or are in close proximity to, the spacers 230. Preferably, the circumferential stop means is configured as spacer pins 230, which extend outwardly from the outer diameter of the ring 228, but the circumferential stop means may, in various embodiments, be configured as balls, protuberances, projections, ridges (continuous or segmented), bosses, and other functionally equivalent structure. As with the coupling 16, the spacers 230 are preferably removable so as to avoid the spacers being incorporated into the weld joining the conduit ends, whereby a strong, uniform weld is achievable. However, it has also been found that the spacers need not be used in all applications, because the inner tubes 212b, 214b may be cut back prevent the coupling 200 from moving laterally within the conduits 212, 214, i.e., the coupling 200 will remain locked in place within the conduits. However, because the tubes 212b, 214b and pipes 212a, 214a may expand and contract at differing rates, the coupling 200 may move slightly within the conduits 212, 214 unless the weld connection is attached to the ring 228.

The recesses 222, 224 adjacent each of the ends 20, 22 of the coupling 200 preferably include the pair of seal grooves, 46, 48 as in the coupling 16, and are also preferably disposed as pairs of seal grooves 46, 48 such that a seal groove 46 or 48 is located on each side of, and equidistant from, the alignment recess 244. Each of the recesses 222 or 224 terminates inwardly of the coupling end 20 or 22 in an annular ledge 223, which, in combination with the surface of the recesses 222, 224, define a minor diameter portion on each end of the coupling 200. The inboard seal groove 46 has a depth to accommodate a first seal 50 such as an o-ring therein. The first seal 50 is preferably a high temperature seal configured from a high temperature material, such as silicone, capable of withstanding a temperature of approximately 300 degrees Fahrenheit. The second groove 48 is positioned between the first groove 46 and the adjacent end 20 or 22 of the coupling 200, and is sized at a depth to receive a second seal 52 such as an o-ring therein. The second seal 52 may be any material capable of withstanding the corrosive and/or erosive environment created by the fluids being transported. The seals 50, 52 preferably have the same cross section, and therefore the radial extent of seals 50, 52 from the recesses 222, 224 of the coupling 16 will depend on the depths of seal grooves 46, 48. Typically, the depth of the seal grooves will be approximately 0.060 inches.

The highest compression set of either of the seals 50, 52 is preferably about 25%. If the coupling 16 will be exposed to high pressures within the conduits 212, 214, backup rings may be provided in the grooves 46, 48. These rings, if required, are preferably configured from a high temperature conformable material such as Viton. The grooves 46, 48 are spaced a sufficient distance from the weld to ensure that the temperatures at the seals 50, 52 disposed therein do not exceed the limit temperatures of the material used in the seal 46 or 48.

The recesses 222, 224 are sized such that the outer diameter of the coupling 200, at the recesses 222, 224, is slightly smaller than the inner diameter of the tubes 212b, 214b maintained within the pipes 212a, 214a. Since the tubes 212b, 214b employ a thin-wall construction and conventional manufacturing tolerances for tubular goods are defined as a percentage of wall thickness, tight tolerances between the tubes and the coupling 200 are achievable, permitting the selection of relatively thin seals 50, 52. Thus, e.g., tubes having diameters below 24 inches may utilize Series 100 o-rings instead of conventionally-sized Series 200 o-rings.

To position the coupling 200 in the adjacent ends of the pipes 212a, 214a, the tubes 212b, 214b are cut back within the pipes at a distance from the pipe ends slightly greater than the length of the recesses 222, 224 on the coupling 200, and the coupling 200, with the o-rings 50, 52 thereon, is inserted into the ends of the conduits 212, 214. Alternatively, the tubes 212b, 214b may be pre-terminated inwardly of the conduit ends. By making the cut-back length of the tubes 212b, 214b inwardly of the adjacent ends of the pipes 212a, 214a as slightly greater than the length of the recesses 222, 224, small gaps 225 are provided between the annular ledges 223 of the coupling 200 and the ends of the tubes 212b, 214b at ambient temperatures. These gaps 225 allow for thermal expansion of the tubes when hot fluids are passed through the pipe, without the coupling 200 or conduits 212, 214 becoming excessively compressively loaded.

Once the coupling 200 is positioned in the ends of conduits 212, 214, the conduit ends may be welded together, as described herein for the continuous corrosion barrier 10 using the coupling 16, i.e., using the spacers 30, or as described herein using the coupling 100 where the spacers are not used in conjunction with the coupling 200, to complete the connection. Additionally, as shown in FIG. 8, the connection of the ends of conduits 212, 214 may be provided by welding flanges 250, 252 to the conduit ends before the connection is made, and then joining the conduit ends at the flanges with mechanical means such as studs and nuts, clamps, and the like. In this configuration, the spacers may be used to center the coupling 200 within the conduit ends, or, the spacers may be removed, so long as the conduits are equipped with inner tubes 212b, 214b, or other tubular barrier material, that is capable of preventing substantial lateral movement of the coupling 200 from the connection of the conduit ends at the flanges. Alternatively, a third o-ring 231 may be employed in a central circumferential recess in the coupling 200 positioned at the location of flanged interconnection to further seal the flanged connection. Gaskets 233 formed of the same material as the tubes 212b, 214b are also used to seal the flanged connection between the ends of the conduits 212, 214, as shown in FIG. 8.

The structure of the coupling 200 provides substantial benefit to pipe line applications, such as pipe runs in chemical plants or refineries, because it eliminates the need for the flanged connection of the conduits as is currently required in such applications. By eliminating the flanged connection, and instead welding the conduit ends together, the costs of flanging the pipe 206 and flaring the ends of an internal corrosion barrier are eliminated. Likewise, the elimination of the flanged connection eliminates fugitive emissions from the conduit connections. Further, by eliminating the flanged connection, and instead cutting back a barrier such as tubes 212b, 214b inwardly of the ends of conduits 212, 214, the loading of the tubes 212b, 214b from thermal cycling is substantially eliminated. This permits the use of longer pipe and tube lengths, because the tubes 212b, 214b may expand linearly within the pipes 212a, 214a up to the size of the gaps 225 between the annular walls 223 on the coupling 200 and the ends of the tubes 212b, 214b without risk of inducing failure of the tubes. Additionally, the use of the coupling 200 eliminates the failure point in the tubes 212b, 214b existing at the flared corners of prior art tubular barriers, thus increasing the reliability of the connection.

Furthermore, the coupling 200 may be used in conjunction with a flanged connection and still provide the improvements in the reduction of thermally induced stresses in the tubes 212b, 214b. Where the coupling 200, or the couplings 16, 100, are used in conjunction with flanged pipe, the spacers 30/230 need not be provided, but other means, such as the cut-back inner tubes 212b, 214b, must be present to prevent the coupling 200 from moving within the conduits by a distance sufficient to expose the weld area. Additionally, where the connection is flanged, rather than welded, the thermal stability of the coupling 200 and seals 46, 48 is not as critical as in a welded connection, because the connection will not be exposed during use to temperatures approaching those encountered when the conduit ends are welded. Therefore, it is possible, in these circumstances, to provide the coupling 200 without the heat resistant material 254 and build the coupling 200 from materials having lower thermal resistance, which further simplifies the manufacture and assembly of the coupling 200. These modifications to coupling 200 may also be used, in conjunction with coupling 100, and coupling 16, where the connection is not welded. It is even contemplated that the spacers 30 of the coupling 16 may be placed between the flanges, to secure the coupling in the conduit ends 20, 22.

Figure 9:
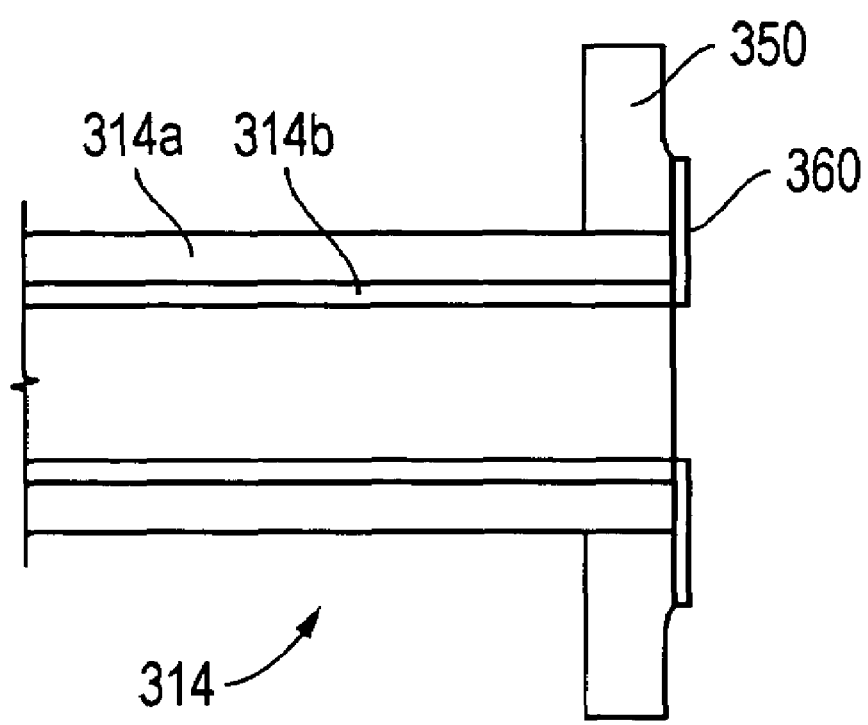
FIG. 9 is a sectional view of an alternative flanged corrosion-resistant conduit assembly according to the present invention.

An alternative flanged connection is shown in FIG. 9 that employs a composite conduit 314 having an inner tube 314b within an outer pipe 314a, as described herein. Conduit 314 is connected to a complementing conduit 312 (not shown) using mating flanges, one of which is indicated at 350. Flange 350 is secured to the end of conduit 314 either by welding or by threaded interconnection, in manners that are well known in the relevant art. Flange 350 is formed of the same material as pipe 314 (e.g., API "5L"), thereby facilitating the welding of the two members if desired. The inner tube 314b is preferably formed of a steel that resistant to corrosion and/or erosion by the materials transported therethrough, and is furthermore able to withstand the heat generated should the flange 350 be connected to conduit 314 by welding. The connection preferably employs a gasket 360 formed of the same material as tube 314b (e.g., a stainless steel) to protect the flange 350 and pipe 314a against corrosion and/or erosion by the fluids being transported via the conduit 314.

Returning to the welded interconnection of conduits, the couplings 16, 100 and 200 provided herein provide a continuous corrosion barrier at the weld joint between adjacent ends of conduits 12, 14, conduits 112, 114 and conduits 212, 214, respectively. The bodies of couplings 16, 100 and 200 are preferably integrally non-corrosive, being of the same material as the inner tubes of the composite conduits described herein, and therefore need not be separately coated with a protective barrier to prevent corrosion or erosion thereof. Additionally, the couplings 16, 100 and 200 may be used without the risk of affecting the weld by the sacrificing of circumferential stop means, e.g., spacers 30, 230. Further, because the edges of the ring member 28 may be isolated from the coupling 16 by the insulative member 54, the quantity of the weld heat which actually transfers to the inner diameter of the coupling is reduced. Furthermore, the preferred multiple seal arrangement ensures that the couplings 16, 100 or 200 will protect the weld area irrespective of the size of the pipe within each pipe size tolerance.

When the body of coupling 16, 100 or 200 is formed of the same material is the inner tube of the composite conduit, this increases the reliability of the seal provided by seals 46, 48 because improved manufacturing precision is achievable over prior art coated or lined pipes, eliminating the need for differing seal groove depths or O-ring sizes to compensate for wider tolerances.

Although the preferred embodiments of the invention have been described embodying multiple features of the invention, each of the individual features of the invention may be used separately, or concurrently, to provide improvements in the connection of conduits 12, 14. For example, the spacers 30 may extend through the ring member 28, and be semi-permanently affixed to the coupling. Furthermore, the present invention may be utilized in numerous environments, including the casing of boreholes formed through subsurface formations of interest in hydrocarbon drilling operations.

It will be understood from the foregoing description that various modifications and changes may be made in the preferred and alternative embodiments of the present invention without departing from its true spirit. This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of forming a conduit assembly for transporting fluids, comprising the steps of:
    forming a pair of weldable conduits, each of the conduits being formed by:
        positioning a tube formed of a material having desirable properties within a pipe formed of a commonly weldable material such that one end of the tube is aligned with one end of the pipe, the tube having an outer diameter slightly less than the inner diameter of the pipe;
        affixing the tube to the pipe by connecting the aligned ends thereof; and
        compressing the pipe in a reducing operation so that the inner diameter of the pipe is reduced to a diameter that is less than or equal to the outer diameter of the tube; and
    positioning the conduits in opposing relation and placing an end of each of the conduits about the respective opposing ends of a coupling for welded interconnection of the conduits, the coupling including:
        a cylindrical body formed of the same material as the tubes of the conduits, the body having:
            an outer diameter that is slightly less than the inner diameter of the tubes of the conduits, and
            a circumferential recess intermediate the ends of the body, and
        a ring formed of the same material as the tubes of the conduits, the ring being positioned within the recess of the body and having a circumferential stop means for limiting movement of the ends of the body within the respective ends of the conduits by the ends of the conduits abutting the stop means; and
        at least one circumferential seal intermediate the recess and each of the tapered ends of the body for sealing the interconnected conduits;
    temporarily affixing the ends of the conduits to one another in the region of the circumferential stop means of the ring;
    removing the circumferential stop means of the ring to clear an annular pathway for welded interconnection of the ends of the conduits; and
    welding the ends of the conduits together in the annular pathway.

2. The method of claim 1, wherein the tube of each conduit is formed of a material having desirable corrosion-resistant and erosion-resistant properties.

3. The method of claim 1, wherein the pipe of each conduit is formed of a carbon steel.

4. The method of claim 3, wherein the pipe of each conduit is formed of a carbon steel selected from the group of steels having an API designation of 5L and steels having an ASTM designation of A106.

5. The method of claim 1, wherein the tube of each conduit is formed of a stainless steel.

6. The method of claim 1, wherein the tube of each conduit is formed of an alloy containing one or more materials selected from the group of chromium, molybdenum, nickel, iron, copper, and titanium.

7. The method of claim 1, wherein the tube of each conduit is formed of an alloy selected from the group of stainless steel, hastelloy, inconel, incoloy, and monel.

8. The method of claim 1, wherein the tube of each conduit is affixed to the pipe by tack welding the aligned ends thereof together.

9. The method of claim 1, wherein the tube of each conduit is affixed to the pipe by clamping the aligned ends thereof together.

10. The method of claim 1, wherein the reducing operation includes rolling the pipe of each conduit.

11. The method of claim 1, wherein the reducing operation includes forcing the pipe of each conduit through a die.

12. The method of claim 1, wherein the cylindrical body of the coupling further has an inner diameter that varies to form a taper at each end of the body.

13. The method of claim 1, wherein the coupling further includes an insulator positioned in the recess between the ring and the body for inhibiting the transfer of heat produced by welding the ends of the conduits together.

14. The method of claim 1, where the step of welding the ends of the conduits together in the annular pathway includes welding the ring to the tubes of the opposing conduits and welding the pipes of the opposing conduits to each other.

15. The method of claim 14, where the ring is welded to the tubes of the opposing conduits in a first welding pass and the pipes of the opposing conduits are welded to each other in a second welding pass.

* * * * *